United States Patent
Doi et al.

(10) Patent No.: US 7,768,214 B2
(45) Date of Patent: Aug. 3, 2010

(54) STEP-UP/DOWN REGULATOR CIRCUIT AND LIQUID CRYSTAL DISPLAY DEVICE INCORPORATING IT

(75) Inventors: Mikiya Doi, Kyoto (JP); Kenichi Nakata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 321 days.

(21) Appl. No.: 11/816,201

(22) PCT Filed: Oct. 21, 2005

(86) PCT No.: PCT/JP2005/019363

§ 371 (c)(1),
(2), (4) Date: Aug. 14, 2007

(87) PCT Pub. No.: WO2006/090507

PCT Pub. Date: Aug. 31, 2006

(65) Prior Publication Data
US 2009/0009104 A1    Jan. 8, 2009

(30) Foreign Application Priority Data
Feb. 25, 2005 (JP) .............................. 2005-050070
Jul. 25, 2005 (JP) .............................. 2005-213738

(51) Int. Cl.
*G05F 1/00* (2006.01)
(52) U.S. Cl. ................. 315/291; 315/247; 315/307; 315/224; 315/226; 315/287; 323/224; 323/259; 323/281; 323/282
(58) Field of Classification Search ............... 315/247, 315/291, 307, 282, 224, 169.1–169.4, 216, 315/226, 242, 287; 323/222, 224, 243, 225, 323/266, 259, 280–282, 284, 285; 345/63, 345/76, 77, 102; 349/61, 69, 71
See application file for complete search history.

(56) References Cited

U.S. PATENT DOCUMENTS

| 6,580,253 | B2 | 6/2003 | Kanakubo et al. |
| 6,642,696 | B2 | 11/2003 | Tateishi |
| 6,724,174 | B1 * | 4/2004 | Esteves et al. ............. 323/224 |

(Continued)

FOREIGN PATENT DOCUMENTS

| JP | 10-146046 | 5/1998 |
| JP | 2003-052170 | 2/2003 |
| JP | 2003-180072 | 6/2003 |
| JP | 2004-135442 | 4/2004 |

OTHER PUBLICATIONS

Caricchi et al. "Study of B-Directional Buck-Boost Converter Topologies for Application in Electrical Vehicle Motor Drives" IEEE, pp. 287-293 (1998).

(Continued)

*Primary Examiner*—Haissa Philogene
(74) *Attorney, Agent, or Firm*—Fish & Richardson P.C.

(57) ABSTRACT

A step-up/step-down regulator circuit wherein a switch has a terminal connected to an end of an inductor, another terminal grounded, and a control terminal connected to an end of a switch. In this way, performing an open/close control of the switch can indirectly perform an open/close control of the switch, thereby solving the problem that the structure and operation of a switch control circuit will be complicated when the switching between step-up and step-down operation is realized.

16 Claims, 8 Drawing Sheets

U.S. PATENT DOCUMENTS

| | | | |
|---|---|---|---|
| 6,919,713 B2 | | 7/2005 | Hoshino et al. |
| 6,963,329 B2 * | | 11/2005 | Lee ............................ 345/102 |
| 7,256,570 B2 * | | 8/2007 | Zhou et al. .................. 323/224 |
| 2004/0070376 A1 | | 4/2004 | Hoshino et al. |

OTHER PUBLICATIONS

K. Huijoong, "Non-Isolated Type DC-DC Converter (1)", EP&C Monthly, pp. 128-142 (2000) (with partial English translation).

* cited by examiner (a) CUK CIRCUIT (b) ZETA CIRCUIT (c) SEPIC CIRCUIT (a) CONTINUOUS MODE (b) DISCONTINUOUS MODE

STEP-UP/DOWN REGULATOR CIRCUIT AND LIQUID CRYSTAL DISPLAY DEVICE INCORPORATING IT

TECHNICAL FIELD

The present invention relates to a step-up/down regulator circuit that steps up or down an input voltage to generate a desired output voltage, and to a liquid crystal display device incorporating such a step-up/down regulator circuit.

BACKGROUND ART

Conventionally, various types of step-up/down regulator circuits have been disclosed and suggested that step up or down an input voltage to generate a desired output voltage (see, for example, Patent Publication 1).

FIG. 6 is a circuit diagram showing a conventional example of a step-up/down regulator circuit. As shown in the figure, the conventional step-up/down regulator circuit includes a switch control circuit a1, a step-down switch a2, an inductor a3, diodes a4 and a5, a smoothing capacitor a6, and a step-up switch a7, and is so configured as to step up or down an input voltage Vin from a direct-current power supply a8 to generate a desired output voltage Vout and then feed it to a load 9.

More specifically, in the step-up/down regulator circuit configured as described above, the switch control circuit a1 monitors the output voltage Vout. When a step-up operation is needed, the switch control circuit a1 turns on and off the step-up switch a7 so as to step up the output voltage Vout to a desired value. During the step-up operation, the step-down switch a2 is kept on. On the other hand, when a step-down operation is needed, the switch control circuit a1 turns on and off the step-down switch a2 so as to step down the output voltage Vout to a desired value. During the step-down operation, the step-up switch a7 is kept off.

Incidentally, other than the step-up/down regulator circuit configured as described above, there have also been known step-up/down regulator circuits called, among others, Cuk circuit, Zeta circuit, SEPIC circuit (see FIGS. 7 (a) to 7(c)).

Patent Publication 1 J P-A-2003-180072

DISCLOSURE OF THE INVENTION

Problems to be Solved by the Invention

Certainly, as compared with the conventional configuration in which step-up and step-down operations are performed by switching between separately provided step-up and step-down regulator circuits as necessary, the step-up/down regulator circuit configured as described above permits easy switching between step-up and step-down operations without inviting a drop, undershoot, or overshoot in the output voltage Vout or oscillation resulting from a transient phenomenon occurring when the circuits are switched, and thus helps achieve improved transient response, lower current consumption, and improved efficiency.

In the step-up/down regulator circuit configured as described above, however, switching between step-up and step-down operations requires the switch control circuit a1 to turn on and off both the step-down switch a2 and the step-up switch a7. This complicates the configuration and the operation of the switch control circuit a1.

Moreover, in the step-up/down regulator circuit configured as described above, whereas ideally the switch voltage Vsw that appears at one end of the inductor a3 should have a waveform in which rectangular waves appear continuously as shown in FIG. 8(a) (a so-called continuous mode), when the load is light or null, the output electric current of the step-up/down regulator circuit may become so reduced as to reduce the coil current IL as a whole, causing a disturbed waveform called ringing as shown in FIG. 8(b) (a so-called discontinuous mode). In this discontinuous mode, under the influence of an undesired ringing noise that appears during the period in which the switches should be off, their switching may be controlled erroneously, making the output voltage unstable.

On the other hand, the conventional step-up/down regulator circuits shown in FIGS. 7(a) to 7(c) are all so configured as to require a capacitor Cb as an energy storage device in addition to a smoothing capacitor Ca. Thus, these circuits, when integrated, require an unnecessarily large circuit configuration.

Considering the above described inconveniences, an object of the present invention is to provide a step-up/down regulator circuit that, despite having a simple configuration, is capable of easily and properly switching between step-up and step-down operations, and a liquid crystal display device incorporating it.

Means for Solving the Problem

To achieve the above described object, according to one aspect of the present invention, a step-up/down regulator circuit that generates a desired output voltage by stepping up or down the input voltage includes: first switching means whose one end is connected to the input voltage input terminal; an inductor whose one end is connected to the other end of the first switching means; second switching means whose one end is connected to the other end of the inductor, whose other end is connected to a standard voltage input terminal, and whose control end is connected to the other end of the first switching means; a first diode whose cathode is connected to the other end of the first switching means, and whose anode is connected to the standard voltage input terminal; a second diode whose anode is connected to the other end of the inductor, and whose cathode is connected to a voltage output terminal; a capacitor whose one end is connected to the voltage output terminal, and whose other end is connected to the standard voltage input terminal; feedback voltage generating means for generating a feedback voltage according to the output voltage; error amplification means for amplifying and outputting the difference between the feedback voltage and a predetermined reference voltage; and switch control means that opens and closes the first switching means to reduce the output from the error amplification means (the first configuration). This configuration, simple as it is, makes it possible to easily and properly switch between step-up and step-down operations.

In the step-up/down regulator circuit of the first configuration described above, it is preferable to adopt FETs as the first and second switching means (the second configuration). This configuration, as compared with one adopting bipolar transistors or the like as the first and second switching means, offers higher voltage conversion efficiency.

In the step-up/down regulator circuit of the first configuration described above, it is preferable that the first switching means, the error amplification means, and the switch control means be packaged into a semiconductor integrated circuit device, and that the other components be externally fitted to the semiconductor integrated circuit device (the third configuration). This configuration, permitting the use of a power supply IC of a common step-down regulator circuit without modification as the semiconductor integrated device.

According to another aspect of the present invention, a step-up/down regulator circuit that generates a desired output voltage by stepping up or down the input voltage includes: first switching means whose one end is connected to the input voltage input terminal; an inductor whose one end is connected to the other end of the first switching means; second switching means whose one end is connected to the other end of the inductor, whose other end is connected to a standard voltage input terminal, and whose control end is connected to the other end of the first switching means; third switching means whose one end is connected to the other end of the first switching means, whose other end is connected to the standard voltage input terminal, and whose current capacity is designed to be lower than the current capacity of the first switching means; a first diode whose cathode is connected to the other end of the first switching means, and whose anode is connected to the standard voltage input terminal; a second diode whose anode is connected to the other end of the inductor, and whose cathode is connected to a voltage output terminal; a capacitor whose one end is connected to the voltage output terminal, and whose other end is connected to the standard voltage input terminal; feedback voltage generating means for generating a feedback voltage according to the output voltage; error amplification means for amplifying and outputting the difference between the feedback voltage and a predetermined reference voltage; and switch control means that opens and closes the first switching means to reduce the output from the error amplification means, and, complementarily thereto, opens and closes the third switching means (the fourth configuration).

According to another aspect of the present invention, a step-up/down regulator circuit that generates a desired output voltage by stepping up or down the input voltage includes: first switching means whose one end is connected to a voltage input terminal; an inductor whose one end is connected to the other end of the first switching means; second switching means whose one end is connected to the other end of the inductor, whose other end is connected to a standard voltage input terminal, and whose control end is connected to the other end of the first switching means; third switching means whose one end is connected to the other end of the first switching means, and whose other end is connected to the standard voltage input terminal; a diode whose anode is connected to the other end of the inductor, and whose cathode is connected to a voltage output terminal; a capacitor whose one end is connected to the voltage output terminal, and whose other end is connected to the standard voltage input terminal; feedback voltage generating means for generating a feedback voltage according to the output voltage; error amplification means for amplifying and outputting the difference between the feedback voltage and a predetermined reference voltage; and switch control means that opens and closes the first switching means to reduce the output from the error amplification means, and, complementarily thereto, opens and closes the third switching means (the fifth configuration).

According to another aspect of the present invention, a step-up/down regulator circuit that generates a desired output voltage by stepping up or down the input voltage includes: first switching means whose one end is connected to the input voltage input terminal; an inductor whose one end is connected to the other end of the first switching means; second switching means whose one end is connected to the other end of the inductor, whose other end is connected to a standard voltage input terminal, and whose control end is connected to the other end of the first switching means; third switching means whose one end is connected to the other end of the first switching means, and whose other end is connected to the standard voltage input terminal; fourth switching means whose one end is connected to the other end of the inductor, and whose other end is connected to the voltage output terminal; a capacitor whose one end is connected to the voltage output terminal, and whose other end is connected to the standard voltage input terminal; feedback voltage generating means for generating a feedback voltage according to the output voltage; error amplification means for amplifying and outputting the difference between the feedback voltage and a predetermined reference voltage; and switch control means that opens and closes the first switching means to reduce the output from the error amplification means, and, complementarily thereto, opens and closes the third and fourth switching means (the sixth configuration).

The fourth to sixth configurations described above, simple as they are, make it possible to easily and properly switch between step-up and step-down operations. In addition, these configurations properly prevent ringing that appears when the load is light, and thereby help achieve more stable step-up and step-down operations.

According to a further aspect of the present invention, a liquid crystal display device includes: a direct-current power supply; a DC/DC converter serving as converting means for converting the output from the direct-current power supply; and a liquid-crystal display panel that is driven by the output voltage from the DC/DC converter. Here, the liquid crystal display device is provided with, as the DC/DC converter, the step-up/down regulator circuit of any of the first to sixth configurations described above (the seventh configuration). In this configuration, regardless of whether the input voltage from the direct-current power supply is higher or lower than a desired output voltage, the DC/DC converter keeps generating the desired output voltage. This stabilizes the display operation of the liquid crystal display device.

Advantages of the Invention

As described above, with a step-up/down regulator circuit according to the present invention and with a liquid crystal display device incorporating it, simple as they are, unlike those employing a plurality of switching means whose operation is coordinated, step-up and step-down operations can be easily and properly switched between each other only by opening and closing a single switching means. This makes it possible to obtain a desired output voltage without failure.

It is also possible to properly prevent ringing that appears when the load is light, and thereby to achieve more stable step-up and step-down operations.

| List of Reference Symbols | |
|---|---|
| 1 | direct-current power supply |
| 2 | DC/DC converter (step-up/down regulator circuit) |
| 3 | TFT liquid crystal panel |
| IC1 | semiconductor integrated circuit device |
| CTRL | switch control circuit |
| N1 | N-channel MOS field-effect transistor (first switching means) |
| N2 | N-channel MOS field-effect transistor (second switching means) |
| N3a, N3b | N-channel MOS field-effect transistor (third switching means) |
| N4 | N-channel MOS field-effect transistor (fourth switching means) |
| ERR | error amplifier |
| E1 | direct-current voltage source (band-gap power supply circuit) |
| T1 | input terminal |
| T2 | output terminal |
| T3 | feedback terminal |
| T4 | control terminal |
| L1 | inductor (coil) |
| D1, D2 | diode |
| C1 | smoothing capacitor |
| R1, R2 | resistor |

BEST MODE FOR CARRYING OUT THE INVENTION

The following description discusses examples of how the present invention is applied to a DC/DC converter that is incorporated in a liquid crystal display device for the purpose of converting the output voltage of a direct-current power supply so as to generate a voltage for driving different parts (in particular, a TFT (thin-film transistor) liquid crystal panel) of the device.

Figure 1:
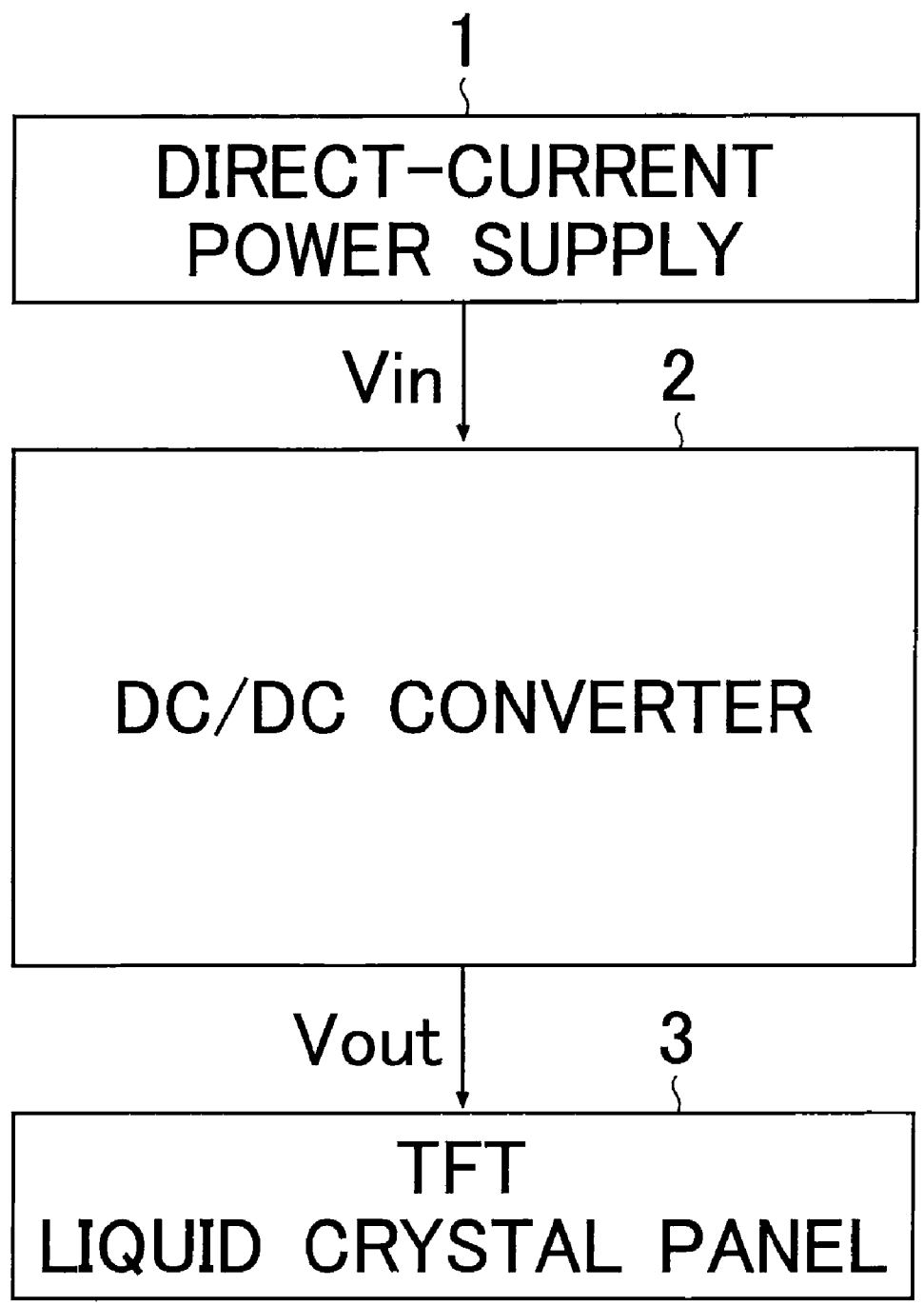
FIG. 1 A block diagram showing an example of the configuration of a liquid crystal display device embodying the present invention.

FIG. 1 is a block diagram showing an example of the configuration of a liquid crystal display device embodying the present invention (in particular, the portion thereof serving as the power supply system for a TFT liquid crystal panel). As shown in the figure, the liquid crystal display device of this embodiment is provided with: a direct-current power supply 1 serving as a power supply inside the device; a DC/DC converter 2 serving as means for converting the output from the direct-current power supply 1; and a TFT liquid crystal panel 3 serving as display means in the liquid crystal display device.

The DC/DC converter 2 converts the input voltage Vin from the direct-current power supply 1 to generate a desired output voltage Vout, and then feeds the output voltage Vout to the TFT liquid crystal panel 3.

Figure 2:
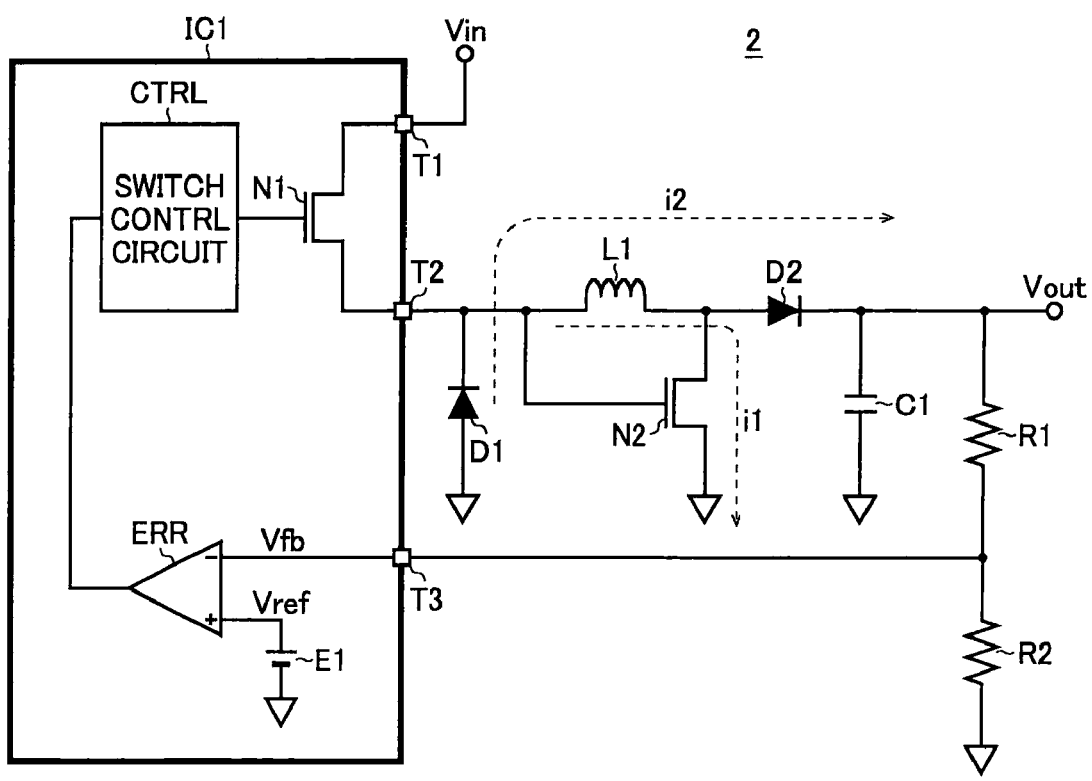
FIG. 2 A circuit diagram showing the DC/DC converter 2 of a first embodiment of the present invention.

FIG. 2 is a circuit diagram (partly presented as a block diagram) showing the DC/DC converter 2 of a first embodiment of the present invention. As shown in the figure, the DC/DC converter 2 of this embodiment includes: N-channel MOS [metal-oxide-silicon] field-effect transistors N1 and N2; an inductor (coil) L1; diodes D1 and D2; a smoothing capacitor C1; resistors R1 and R2; an error amplifier ERR; a direct-current voltage source E1; and a switch control circuit CTRL.

As shown in the figure, in the DC/DC converter 2 of this embodiment, the transistor N1, the error amplifier ERR, the direct-current voltage source E1, and the switch control circuit CTRL are all packaged into a silicon monolithic semiconductor integrated circuit device IC1, and the other components are externally fitted to the semiconductor integrated circuit device IC1. Configured in this way, the DC/DC converter 2 of this embodiment permits the use of a power control IC of a common step-down regulator circuit without modification as the semiconductor integrated circuit device IC1.

Incidentally, in reality, the semiconductor integrated circuit device IC1 further includes, in addition to the above mentioned components, various kinds of protection circuit (for example, those providing protection against low-input-induced malfunctioning, excessive heat, overcurrent, and short-circuiting). However, since these circuits are not directly relevant to the present invention, they are not illustrated nor described in detail. It should also be understood that the present invention may be practiced in any manner other than specifically described here. For example, as necessary, and of the components externally fitted to the semiconductor integrated circuit device IC1 in the figure may be integrated into it.

The drain of the transistor N1 is connected, through the input terminal T1 of the semiconductor integrated circuit device IC1, to the input voltage input terminal (the output terminal of the direct-current power supply 1), and the input voltage Vin is applied to the drain of the transistor N1. The source of the transistor N1 is connected, through the output terminal T2 of the semiconductor integrated circuit device IC1, to one end of the inductor L1, to the gate of the transistor N2, and to the cathode of the diode D1. The anode of the diode D1 is grounded. The drain of the transistor N2 is connected to the other end of the inductor L1, and to the anode of the diode D2. The source of the transistor N2 is grounded. The cathode of the diode D2 is connected to the voltage output terminal (the power input terminal of the TFT liquid crystal panel 3), and is grounded, on one hand, through the smoothing capacitor C1 and also, on the other hand, through a serial circuit formed by the resistors R1 and R2 (which serial circuit constituting a feedback voltage generating circuit that generates a feedback voltage Vfb according to the output voltage Vout). The node between the resistors R1 and R2 serves as the output terminal of the feedback voltage Vfb, and is connected to the inverting input terminal (−) of the error amplifier ERR through the feedback terminal T3 of the semiconductor integrated circuit device IC1. The non-inverting input terminal (+) of the error amplifier ERR is connected to the positive terminal of the direct-current voltage source E1 (for example, a band-gap power supply circuit), and a reference voltage Vref for determining the target value of the output voltage Vout is applied to the non-inverting input terminal (+) of the error amplifier ERR. The negative terminal of the direct-current voltage source E1 is grounded. The output terminal of the error amplifier ERR is connected to the error signal input terminal of the switch control circuit CTRL. The control signal output terminal of the switch control circuit CTRL is connected to the gate of the transistor N1.

In the DC/DC converter 2 configured as described above, the error amplifier ERR amplifies and outputs the difference between the feedback voltage Vfb and the reference voltage Vref, and the switch control circuit CTRL opens and closes the transistor N1 to reduce the output from the error amplifier ERR.

Here, when the transistor N1 is turned on (brought into a closed state), the gate potential of the transistor N2 rises approximately to the input voltage Vin, and this turns the transistor N2 on (brings it into a closed state). Thus, a current flows through the inductor L1 along a path i1, and this causes electric energy to be stored in the inductor L1. During the on-state period of the transistors N1 and N2, if electrical charge is stored in the smoothing capacitor C1, a current flows from the smoothing capacitor C1 to the voltage output terminal. Incidentally, in this state, since the potential at the other end of the inductor L1 is almost as low as the ground potential, the diode D2 is in a reversely-biased state. Thus, no current flows from the smoothing capacitor C1 into the transistor N2.

Subsequently, when the transistor N1 is turned off (brought into an open state), a counter-electromotive voltage appears in the inductor L1, and it causes the electric energy stored therein to be discharged along a path i2. Thus, the gate potential of the transistor N2 becomes negative. In this way, following the transistor N1, the transistor N2 is turned off (brought into an open state). In this state, a current flows along a path i2, and thus from the voltage output terminal into the TFT liquid crystal panel 3, and also through the smoothing capacitor C1 into a ground terminal. This charges the smoothing capacitor C1.

As described above, the DC/DC converter 2 of the present embodiment, which steps up or down an input voltage Vin to generate a desired output voltage Vout, includes: first switching means (a transistor N1) whose one end is connected to an input voltage input terminal; an inductor L1 whose one end is connected to the other end of the first switching means; second switching means (a transistor N2) whose one end is connected to the other end of the inductor L1, whose other end is grounded, and whose control end is connected to the other end of the first switching means; a diode D1 whose cathode is connected to the other end of the first switching means N1, and whose anode is grounded; a diode D2 whose anode is connected to the other end of the inductor L1, and whose cathode is connected to a voltage output terminal; a capacitor C1 whose one end is connected to the voltage output terminal, and whose other end is grounded; feedback voltage generating means (resistors R1, R2) for generating a feedback voltage Vfb according to an output voltage Vout; an error amplifier ERR for amplifying and outputting the difference between the feedback voltage and the predetermined reference voltage Vref; and switch control means CTRL that opens or closes the first switching means to reduce the output from the error amplifier ERR.

In this configuration, by opening and closing the transistor N1 serving as the first switching means, it is possible to indirectly open and close the transistor N2 serving as the second switching means.

Thus, with the DC/DC converter 2 of this embodiment, by properly controlling, with the switch control means CTRL, the drive duty ratio (the on-state period divided by the off-state period) of the transistor N1 serving as the first switching means, more specifically, by decreasing the drive duty ratio to below one for a step-down operation and increasing it to above one for a step-up operation, it is possible to easily and properly switch between step-up and step-down operation even with a simple configuration. Hence, in a liquid crystal display device incorporating this DC/DC converter 2, regardless of whether the input voltage Vin from the direct-current power supply 1 is higher or lower than the desired output voltage Vout, it is possible to always obtain the desired output voltage Vout. Thus, even in a case where, while the desired level of the output voltage Vout is 16 V, the input voltage varies in the range from 6 to 18 V, it is possible to obtain the desired output voltage, and thereby to stabilize the display operation of the liquid crystal display panel 3.

In addition, as shown in FIG. 2, the DC/DC converter 2 of this embodiment uses field-effect transistors N1, N2 as the first and second switching means. This configuration, as compared with one using bipolar transistors or the like as the first and second switching means, offers higher voltage converting efficiency. This, however, is not meant to limit in any way the configuration with which to carry out the present invention; that is, bipolar transistors or the like may be used as the first and second switching means.

Figure 3:
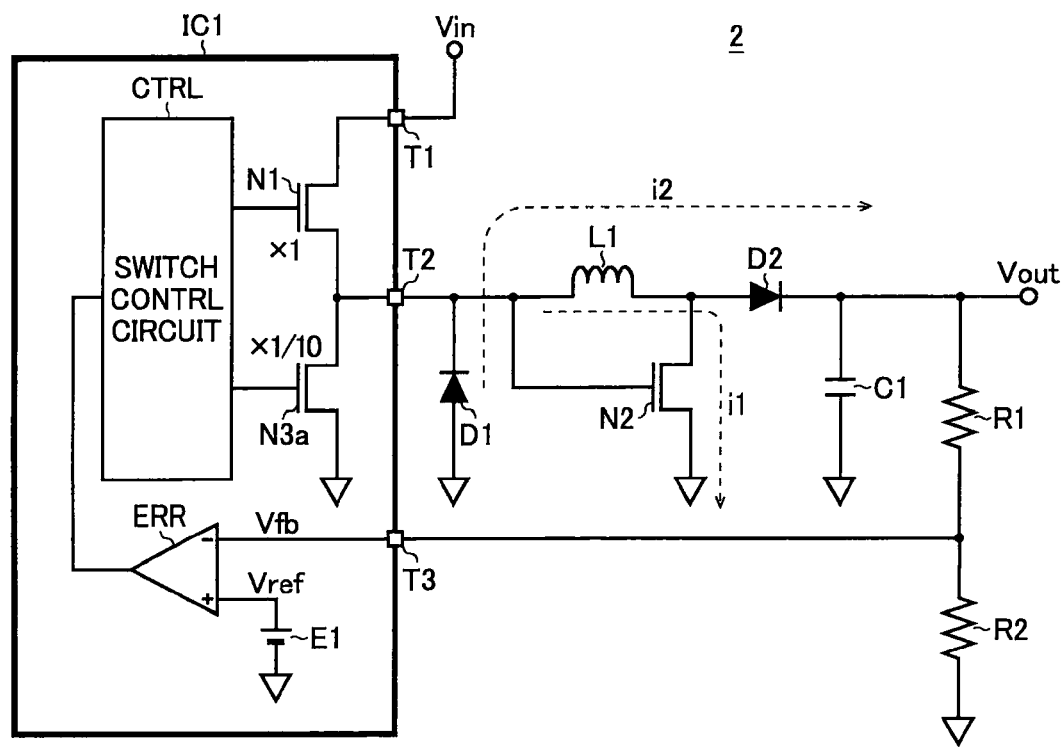
FIG. 3 A circuit diagram showing the DC/DC converter 2 of a second embodiment of the present invention.

Next, the DC/DC converter 2 of a second embodiment of the present invention will be described with reference to FIG. 3. FIG. 3 is a circuit diagram (partly presented as a block diagram) showing the DC/DC converter 2 of the second embodiment. As shown in the figure, the DC/DC converter 2 of this embodiment has almost the same configuration as that of the first embodiment described above. Accordingly, such parts as find their counterparts in the first embodiment are identified with common reference numerals, and no explanations thereof will be repeated; that is, in the following description, emphasis is placed on the feature (additional provision of ringing preventing means) unique to this embodiment.

The DC/DC converter 2 of this embodiment has, as ringing preventing means for preventing ringing when the load is light or null, an N-channel MOS field-effect transistor N3a (third switching means) additionally packaged into the semiconductor integrated circuit device IC1.

The drain of the transistor N3a is connected to the source of the transistor N1. The source of the transistor N3a is grounded. The gate of the transistor N3a is connected to the control signal output terminal of the switch control circuit CTRL.

Incidentally, the transistor N3a should be designed to have a minimum current capacity sufficient to extract ringing noise, which appears in the form of a very small current. This helps prevent unnecessarily increasing the chip area or unduly lowering conversion efficiency. Specifically, in the DC/DC converter 2 of this embodiment, the transistor N3a is given a current capacity lower than that of the transistor N1, through which a large current needs to be passed. More specifically, the transistor N3a is designed to have 1/N (in this embodiment, 1/10) of the gate area of the transistor N1.

As described above, the switch control circuit CTRL opens and closes the transistor N1 so as to reduce the output from the error amplifier ERR, and simultaneously, complementarily thereto, opens and closes the transistor N3a.

Figure 8:
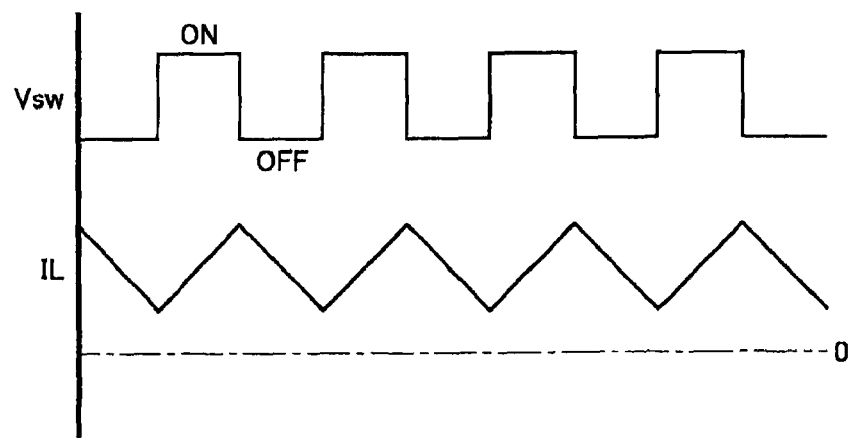
FIG. 8 Diagrams illustrating how ringing appears when the load is light.
Figure 8:
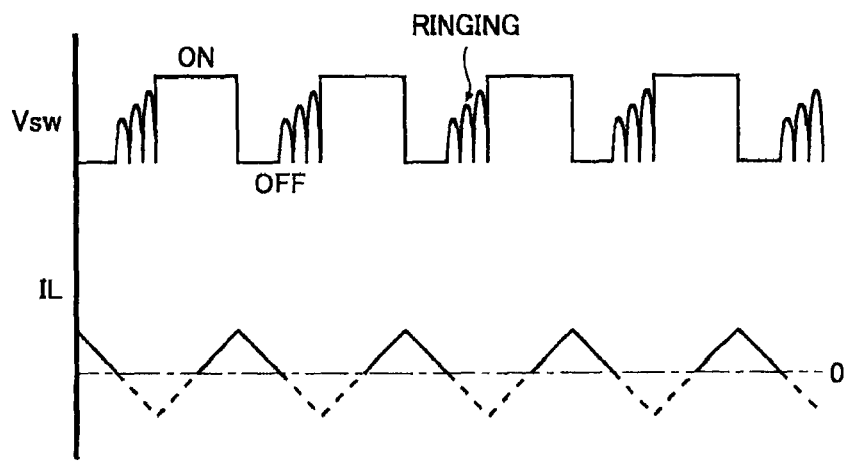

In this configuration, when the load is light or null, even if the output current becomes so reduced as to reduce the coil current as a whole until a disturbed waveform called ringing appears (so-called a discontinuous mode), as shown in FIG. 8(b) described previously, the ringing noise can be diverted to the ground line. This helps prevent the switching of the transistor N2 from being controlled erroneously, and thus helps achieve more stable step-up and step-down operations.

Figure 4:
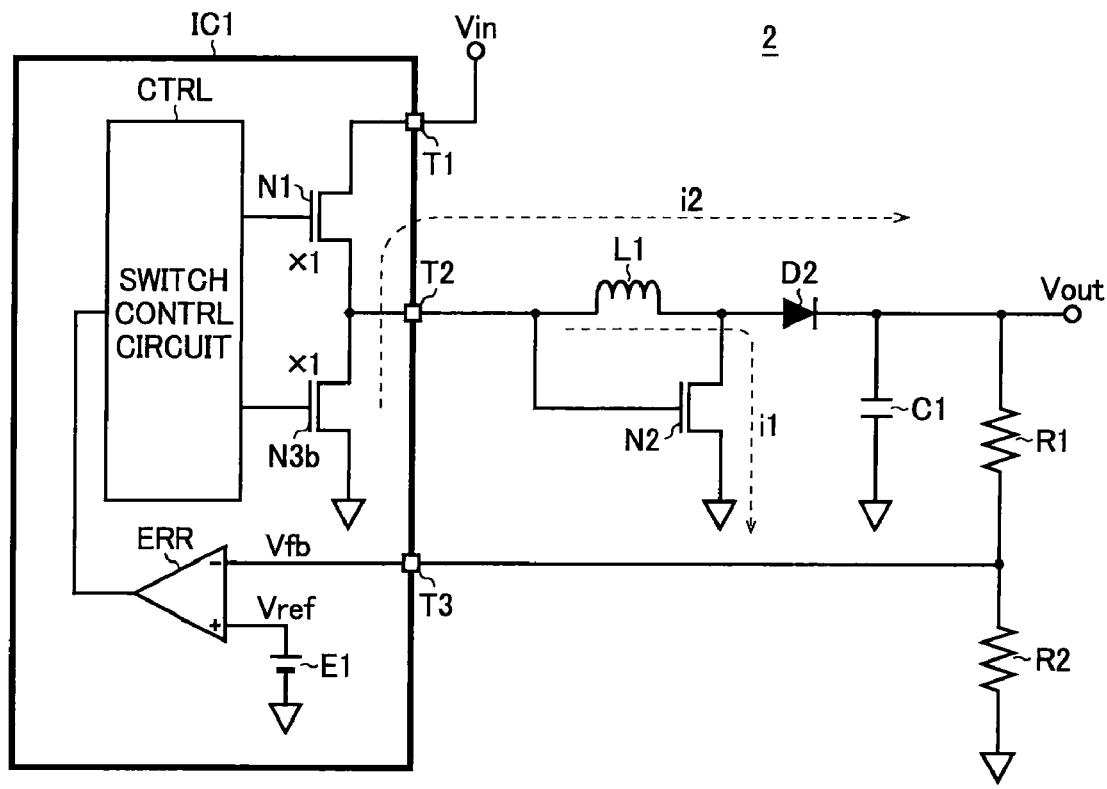
FIG. 4 A circuit diagram showing the DC/DC converter 2 of a third embodiment of the present invention.

Next, the DC/DC converter 2 of a third embodiment of the present invention will be described with reference to FIG. 4. FIG. 4 is a circuit diagram (partly presented as a block diagram) showing the DC/DC converter 2 of the third embodiment. As shown in the figure, the DC/DC converter 2 of this embodiment has almost the same configuration as those of the first and second embodiments described above. Accordingly, such parts as find their counterparts in the first or second embodiment are identified with common reference numerals, and no explanations thereof will be repeated; that is, in the following description, emphasis is placed on the feature (synchronous rectification instead of the diode D1) unique to this embodiment.

The DC/DC converter 2 of this embodiment has, as synchronous rectification means substituting for the diode D1 and as ringing preventing means for preventing ringing when the load is light or null, an N-channel MOS field-effect transistor N3b (third switching means) additionally packaged into the semiconductor integrated circuit device IC1.

The drain of the transistor N3b is connected to the source of the transistor N1. The source of the transistor N3b is grounded. The gate of the transistor N3b is connected to the control signal output terminal of the switch control circuit CTRL.

Incidentally, the transistor N3b is designed to have a current capacity comparable with that of the transistor N1. More specifically, the transistor N3b is designed to have a gate area comparable with that of the transistor N1.

As described above, the switch control circuit CTRL opens and closes the transistor N1 so as to reduce the output from the error amplifier ERR, and simultaneously, complementarily thereto, opens and closes the transistor N3b.

In this configuration, as in the second embodiment described previously, when the load is light or null, even if the output current becomes so reduced as to reduce the coil current as a whole until a disturbed waveform called ringing appears (so-called a discontinuous mode) as shown in FIG. 8(b) described previously, the ringing noise can be diverted via the transistor N3b to the ground line. This helps prevent the switching of the transistor N2 from being controlled erroneously, and thus helps achieve more stable step-up and step-down operations. Moreover, in this configuration, where the diode D1 is replaced with the transistor N3b having a lower on-state resistance than that, it is possible to reduce the electric power lost across the diode D1 in the second embodiment. This helps increase the conversion efficiency of the device. Moreover, as compared with in the second embodiment described previously, one diode, namely the externally fitted diode D1, can be omitted. This helps reduce the circuit scale of the device.

Figure 5:
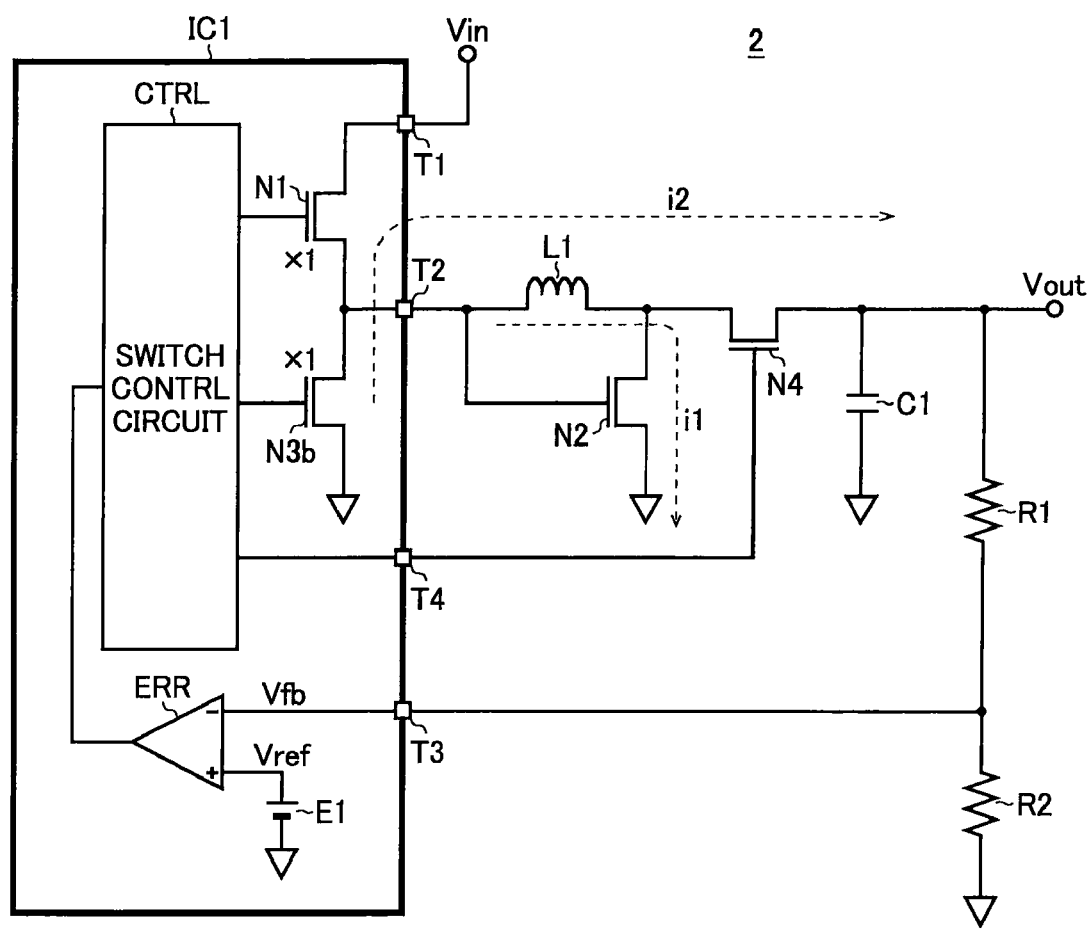
FIG. 5 A circuit diagram showing the DC/DC converter 2 of a fourth embodiment of the present invention.
Figure 6:
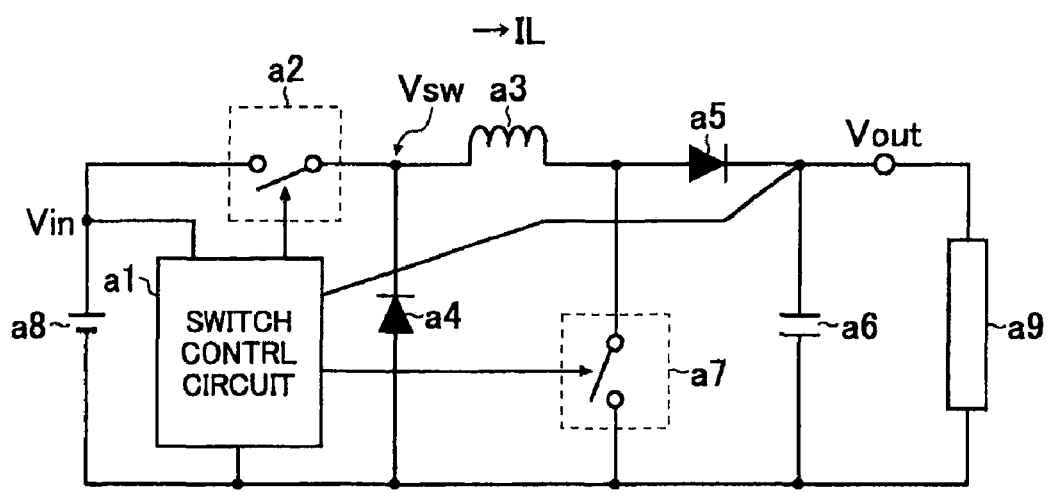
FIG. 6 A circuit diagram showing a conventional example of a step-up/down regulator circuit.
Figure 7:
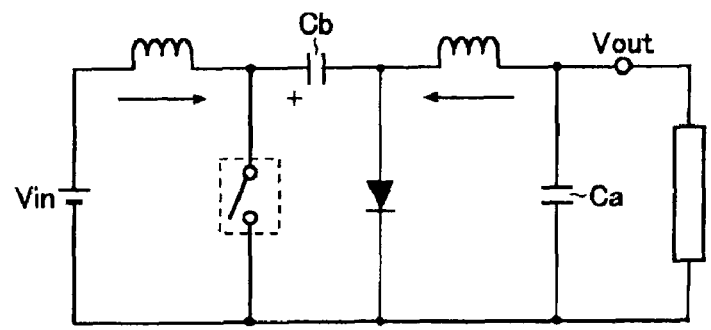
FIG. 7 Circuit diagrams showing other conventional examples of step-up/down regulator circuits.
Figure 7:
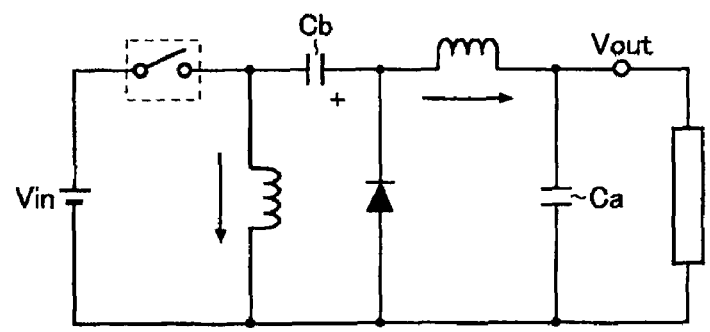
Figure 7:
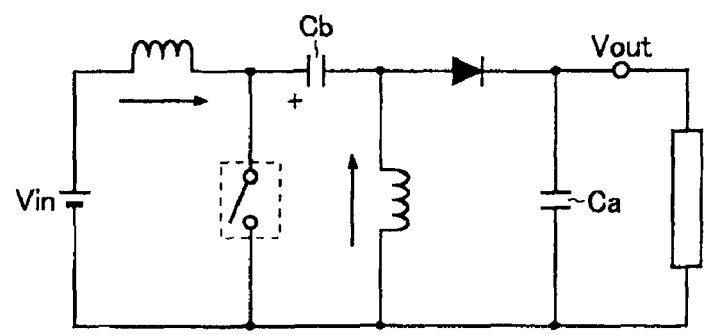

Finally, the DC/DC converter 2 of a fourth embodiment of the present invention will be described with reference to FIG. 5. FIG. 5 is a circuit diagram (partly presented as a block diagram) showing the DC/DC converter 2 of the fourth embodiment. As shown in the figure, the DC/DC converter 2 of this embodiment has almost the same configuration as that of the third embodiment described above. Accordingly, such parts as find their counterparts in the third embodiment are identified with common reference numerals, and no explanations thereof will be repeated; that is, in the following description, emphasis is placed on the feature (synchronous rectification instead of the diode D2) unique to this embodiment.

The DC/DC converter 2 of this embodiment has, as synchronous rectification means substituting for the diode D2, an N-channel MOS field-effect transistor N4 (fourth switching means) externally fitted to the semiconductor integrated circuit device IC1.

The drain of the transistor N4 is connected to the other end of the inductor L1. The source of the transistor N4 is connected to the voltage output terminal. The gate of the transistor N4 is connected to the control signal output terminal of the switch control circuit CTRL through the control terminal T4 of the semiconductor integrated circuit device IC1.

As described above, the switch control circuit CTRL opens and closes the transistor N1 so as to reduce the output from the error amplifier ERR, and simultaneously, complementarily thereto, opens and closes the transistors N3b and N4.

In this configuration, where the diode D2 is replaced with the transistor N4 having a lower on-state resistance than that, it is possible to reduce the electric power lost across the diode D2 in the third embodiment. This helps increase the conversion efficiency of the device.

It should be understood that the term "complementarily" used in the above description of the second to fourth embodiments covers not only cases where the turning on and off of the transistor N1 takes place exactly oppositely to that of the transistors N3a, N3b, and N4 but also cases where, from the perspective of preventing a through current and out of other considerations, the turning on and off of the transistor N1 takes place oppositely to but with a predetermined delay relative to that of the transistors N3a, N3b, and N4.

The embodiments described above all deal with cases where the present invention is applied to a DC/DC converter 2 that generates the driving voltage Vout of the TFT liquid crystal panel 3 by converting the input voltage Vin from the direct-current source 1. This, however, is not meant to limit the application of the present invention to such embodiments. It should be understood that the present invention is applicable to step-up/down regulator circuits in general that step up or down an input voltage to generate a desired output voltage.

The present invention may be carried out in any manner other than specifically described above as embodiments, and permits any variations and modifications within the spirit thereof.

INDUSTRIAL APPLICABILITY

The present invention is useful in simplifying step-up/down regulator circuits.

What is claimed is:

1. A step-up/down regulator circuit that steps up or down an input voltage to generate a desired output voltage, the step-up/down regulator circuit comprising:
    a first switch whose first end is connected to an input voltage input terminal;
    an inductor whose first end is connected to a second end of the first switch;
    a second switch whose first end is connected to a second end of the inductor, whose second end is connected to a standard voltage input terminal, and whose control end is connected to the second end of the first switch;
    a third switch whose first end is connected to the second end of the first switch, and whose second end is connected to the standard voltage input terminal;
    a fourth switch whose first end is connected to the second end of the inductor, and whose second end is connected to an output voltage terminal;
    a capacitor whose first end is connected to the output voltage terminal, and whose second end is connected to the standard voltage input terminal;
    feedback voltage generating circuitry for generating a feedback voltage according to an output voltage at the output voltage terminal;
    an error amplifier for amplifying and outputting a difference between the feedback voltage and a predetermined reference voltage; and
    switch control circuitry for receiving an output from the error amplifier and for opening and closing the first switch so as to reduce an amplitude of the output from the error amplifier, and, complementarily thereto, opening and closing the third and fourth switches.

2. A liquid crystal display device comprising:
    a direct-current power supply;
    a DC/DC converter operable to convert an output from the direct-current power supply; and
    a liquid-crystal display panel operable to be driven by an output voltage from the DC/DC converter,
    wherein the DC/DC converter comprises a step-up/down regulator circuit as recited in claim 1.

3. A step-up/down regulator circuit comprising:
an inductor;
a first switch connected to the inductor and connected to an input voltage and arranged to output the input voltage to the inductor in response to a control signal;
a first path connected to a first connection point between the inductor and the first switch and connected to a standard voltage and arranged to output a current to the inductor;
a second path connected to the inductor and arranged to output an output voltage;
a second switch connected to a second connection point between the inductor and the second path and connected to the standard voltage and arranged to output the standard voltage to the second path in response to a voltage at the first connection point; and
switch control circuitry arranged to output the control signal in response to the output voltage.

4. The step-up/down regulator circuit according to claim 3 further comprising:
feedback voltage generating circuitry connected between the second path and the switch control circuitry and arranged to output a feedback voltage to the switch control circuitry in response to the output voltage.

5. The step-up/down regulator circuit according to claim 4 further comprising:
a capacitor connected to a third connection point between the second path and the feedback voltage generating circuitry.

6. The step-up/down regulator circuit according to claim 4, the feedback voltage generating circuitry comprising:
a first resistor and a second resistor connected in series between the output voltage and the standard voltage, wherein
the feedback voltage is a voltage appearing at a node between the first resistor and the second resistor.

7. The step-up/down regulator circuit according to claim 6 further comprising:
an error signal amplifier arranged to amplify a difference between the feedback voltage and a predetermined reference voltage and arranged to output the control voltage.

8. The step-up/down regulator circuit according to claim 7 wherein the first switch, the error signal amplifier and the switch control circuitry are packaged in a semiconductor integrated circuit device.

9. The step-up/down regulator circuit according to claim 3 wherein the first path comprises a first diode whose anode is connected to the first connection point and whose cathode is connected to the standard voltage.

10. The step-up/down regulator circuit according to claim 9 further comprising:
a third switch connected in parallel with the first diode and arranged to output the standard voltage in response to the switch control circuitry.

11. The step-up/down regulator circuit according to claim 10 wherein a size of the third switch is smaller than that of the first switch.

12. The step-up/down regulator circuit according to claim 3 wherein the first path is a fourth switch, and is controlled by the switch control circuitry, and wherein the first switch and the fourth switch alternately turn on and off respectively.

13. The step-up/down regulator circuit according to claim 3 wherein the second path is a diode whose anode is connected to the inductor.

14. The step-up/down regulator circuit according to claim 3 wherein the second path comprises a fifth switch, and is controlled by the switch control circuitry, and wherein the first switch and the fifth switch alternately turn on and off respectively.

15. The step-up/down regulator circuit according to claim 3 wherein the first switch and the second switch are FETs.

16. A liquid crystal display device comprising:
a direct-current power supply;
a DC/DC converter arranged to convert an output from the direct-current power supply; and
a liquid-crystal display panel driven by an output voltage from the DC/DC converter,
wherein the DC/DC converter comprises a step-up/down regulator circuit as recited in any one of claims 3 to 8.

* * * * *